United States Patent [19]

Katagiri et al.

[11] Patent Number: 5,049,337
[45] Date of Patent: Sep. 17, 1991

[54] MOLDING METHOD FOR MAGNETIC TAPE CASSETTE

[75] Inventors: Shingo Katagiri; Masayoshi Moriwaki, both of Odarawa, Japan

[73] Assignee: Fuji Photo Film Co., Ltd., Kanagawa, Japan

[21] Appl. No.: 414,348

[22] Filed: Sep. 29, 1989

[30] Foreign Application Priority Data

Oct. 13, 1988 [JP] Japan ................. 63-255968

[51] Int. Cl.⁵ .................. B28B 1/48; B28B 7/16; B29B 11/08
[52] U.S. Cl. .................. 264/156; 264/132; 264/155
[58] Field of Search ............... 264/154, 132, 155, 156

[56] References Cited

U.S. PATENT DOCUMENTS 3,699,204 10/1972 Ogata .................... 264/154
4,752,059 7/1988 Oishi et al. .................. 264/264

Primary Examiner—Jan H. Silbaugh
Assistant Examiner—Angela Y. Ortiz
Attorney, Agent, or Firm—Sughrue, Mion, Zinn, Macpeak & Seas

[57] ABSTRACT

A method for image-transfer molding half portions of a casing body of a magnetic tape cassette in which no portions of an image transfer film are left in the cassette holes. The image transfer film includes a base layer, a peeling layer, a protective layer, an ink layer, and an adhesive layer. A band of the image transfer film is pinched between dies for molding said half portion, with the adhesive layer positioned so as to abut an outer surface of the molded half portion. A pair of pins is placed in the dies in a position where a hole is to be formed in the half portion, with an end of one of the pins having a peripheral edge portion projecting in a direction parallel to the longitudinal axis of the pin and forming a recess receiving the end of the other of said pins with a portion of the image transfer film sandwiched therebetween. The ends of the pins cooperate to sever the image transfer film along the peripheral edge except for the base layer so that the base layer can be peeled away leaving no portions of the image transfer film in the holes.

5 Claims, 4 Drawing Sheets

MOLDING METHOD FOR MAGNETIC TAPE CASSETTE

BACKGROUND OF THE INVENTION

The present invention relates to a magnetic tape cassette, and particularly to a method for image-transfer molding the half portions of the casing body of a magnetic tape cassette.

In a magnetic tape cassette, hubs on which a magnetic tape is wound are supported in a casing body composed of upper and lower half portions, which are usually manufactured by the injection molding of a plastic. After the injection molding process, paper or the like on which is printed a prescribed design is adhered to the outside surface of each of the upper and the lower portions, or the design is directly printed on the outside surface. Thus, the manufacture of each of the upper and the lower half portions requires separate steps of injection molding and attachment of the paper or the like or printing of the design. For this reason, the manufacturing process is generally complicated.

A method for image-transfer injection molding in which a prescribed design is printed on the outside surface of each of the upper and lower half portions of the casing body of a magnetic tape cassette at the same time as the injection molding of the half portion has been developed, as disclosed in the Japanese Unexamined Published Utility Model Applications Nos. 113281/88 and 118782/88. Such a method will be described with reference to FIGS. 5 and 6.

For the injection molding process, two dies 1 and 2 are set so that the recesses 3 and 4 thereof constitute a cavity whose form corresponds to that of the upper or lower half portion, and a molten plastic or the like is injected into the cavity through a runner 1b. For image transfer, an image transfer film 20 having a prescribed design in the form of an ink layer is pinched between the dies 1 and 2 so that the film is pushed onto the inside surface of the recess 4 of the die 2 when the molten plastic or the like is injected into the cavity through the runner 1b. At the time of injection, the molten plastic comes into contact with the adhesive layer 18 of the image transfer film 20, which is composed of a base film 6, a peeling layer 7, a protective layer 8, the ink layer 9 and the adhesive layer, as shown in FIG. 7, so that the protective layer and the ink layer are joined to the surface of the injected material by the adhesive layer. After the upper or lower half portion solidifies and is extracted from the dies 1 and 2, the base film 6 can be easily peeled off the upper or lower half portion because of the presence of the peeling layer 7 so that the ink layer 9 coated with the protective layer 8 is left on the outside surface of the half portion. The design of the ink layer 9 is thus transferred to the outside surface of the half portion. For the injection molding process, a pair of nearly cylindrical pins 35 and 36 are fitted in the dies 1 and 2 to provide the half portion of the cassette casing body with a hole such as a reference hole, a capstan hole and a screw hole. The pins 35 and 36 project into the cavity and have their tips in contact with each other to form the hole which extends in the direction of thickness of the half portion.

However, when the image transfer film 20 is pinched between the dies 1 and 2 as shown in FIG. 5, the film is also pinched between the tips of the pins 35 and 36. For this reason, when the base film 6 is peeled off the half portion after the latter has been removed from the dies 1 and 2, an image transfer layer 12, which is composed of the protective layer 8, the ink layer 9 and the adhesive layer 18, and which belongs to part of the image transfer film 20 and is pinched between the pins 35 and 36, is left in the hole as an unnecessary film coupled to the image transfer layer of the other part of the image transfer film stuck to the outside surface of the half portion. Even if the image transfer layer 12 left as an unnecessary film is pierced together with the base film 6 by a sharp-edged pin, as disclosed in Japanese Unexamined Published Utility Model Application No. 113281/88, it is difficult to completely remove the image transfer layer along the inside surface of the hole. Thus, the method of image-transfer injection molding requires a step of completely removing the image transfer layer 12 following injection molding. This, too, is a problem.

SUMMARY OF THE INVENTION

The present invention was made in order to solve these problems. Accordingly, it is an object of the present invention to provide a simplified method for performing the image-transfer injection molding of each half portion of a casing body of a magnetic tape cassette through the use of an image transfer film.

In the method provided according to the present invention, image-transfer injection molding of each half portion of the casing body of the magnetic tape cassette is performed so that at least the image transfer layer of the image transfer film is integrally joined to the surface of the half portion. The method is characterized in that the peripheral edge of the tip of one of several pins, which are fitted in dies so as to form a hole in the half portion, projects parallel to the axis of the pin so that a recess is provided in the tip of the pin inside the peripheral edge. The image transfer layer is torn off by the peripheral edge of the tip of the pin along the edge.

When the image transfer film is pinched between the dies and between the tips of the pins, the film is acutely and strongly bent by the projecting peripheral edge of the tip of one of the pins so that the part of the image transfer layer of the film which is pinched between the tips of the pins is torn off from the other part of the layer along the projecting peripheral edge. Hence, when the base film of the image transfer film is peeled off the half portion after image transfer injection molding, the torn-off part of the image transfer layer is peeled off together with the base film because it still adheres thereto.

DESCRIPTION OF THE PREFERRED EMBODIMENTS

Preferred embodiments of the present invention are hereafter described in detail with reference to the attached drawings.

Figure 1:
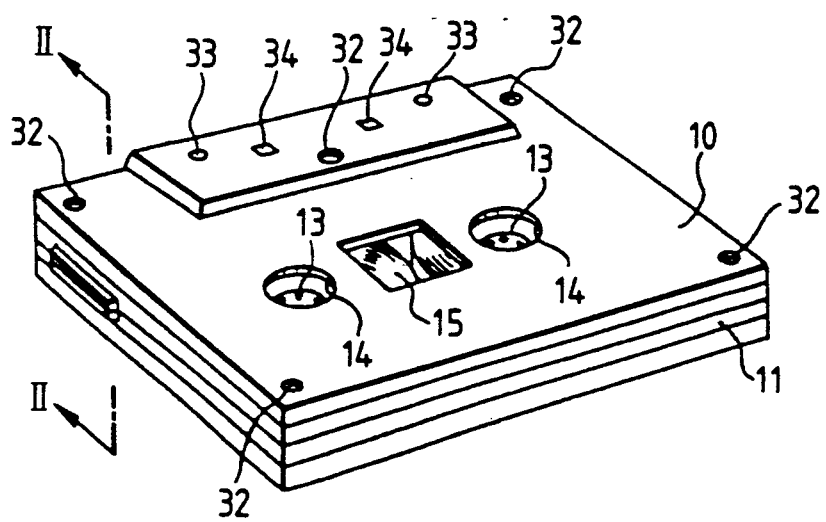
FIG. 1 is a perspective view of a magnetic tape cassette molded in accordance with an image-transfer injection molding method of a preferred embodiment of the present invention.
Figure 2:
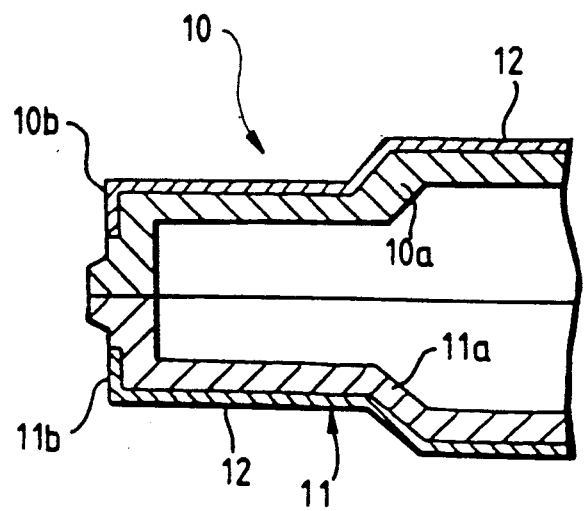
FIG. 2 is a sectional view of the cassette taken along a line II—II in FIG. 1.

FIG. 1 is a perspective view of a magnetic tape cassette, the mutually coupled upper and lower half portions 10 and 11 of the casing body of which are molded by a method of the invention. A pair of hubs 13 on which a magnetic tape 15 is wound are rotatably supported in the casing body of the cassette. The upper and the lower half portions 10 and 11 are manufactured separately by injection molding. FIG. 2 is a sectional view of the cassette taken along a line II—II in FIG. 1.

The upper and the lower half portions 10 and 11 are composed of bodies 10a and 11a made of an injection-molded plastic such as an ABS resin, and image transfer layers 12, which are parts of an image transfer film 20 and cover the outside surfaces of the bodies, as shown in FIG. 2. It is preferable that the image transfer layers 12 cover the edges 10b and 11b of the bodies 10a and 11a of the upper and the lower half portions 10 and 11 as well as the other parts of the bodies to reinforce them.

The image transfer layer 12 is produced on the outside surface of the body of each of the upper and the lower half portions 10 and 11 simultaneously with the injection molding of the body of each of the portions. The production of the image transfer layer 12 will now be described.

Figure 3:
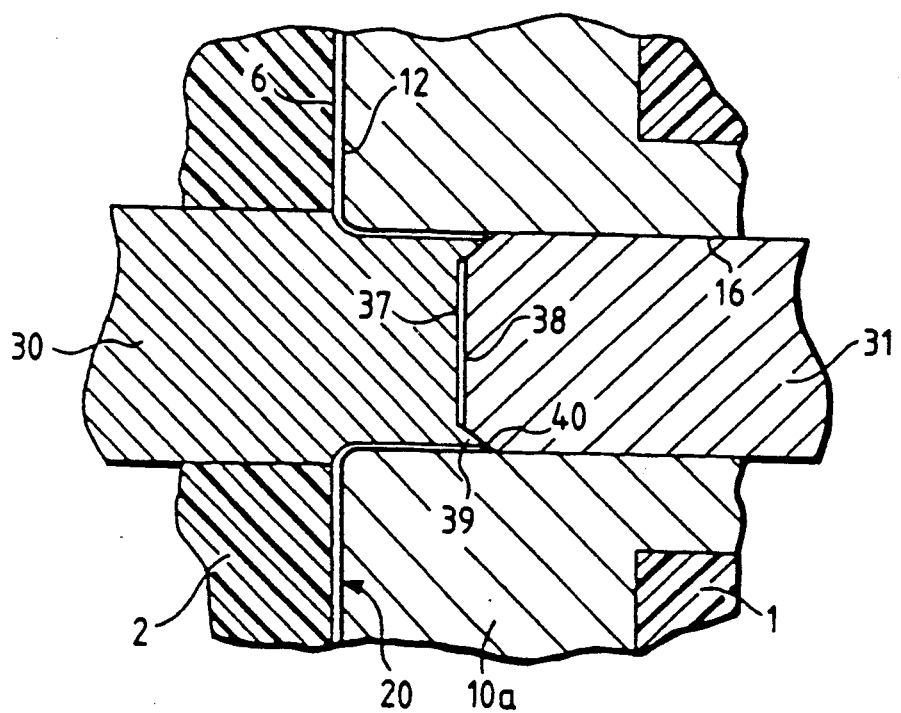
FIG. 3 is an enlarged sectional view of major parts of dies used for the image-transfer injection molding of the half portion of the casing body of the cassette.
Figure 4:
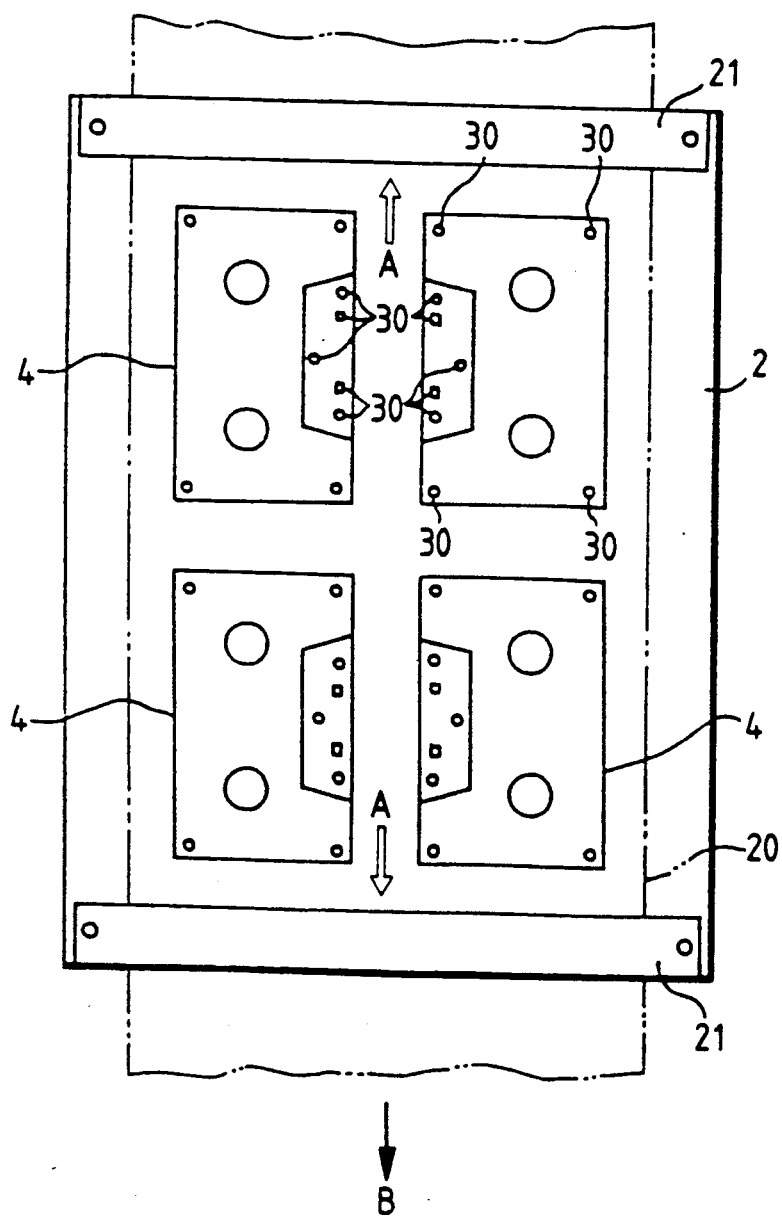
FIG. 4 is a plan view of one of the dies.
Figure 5:
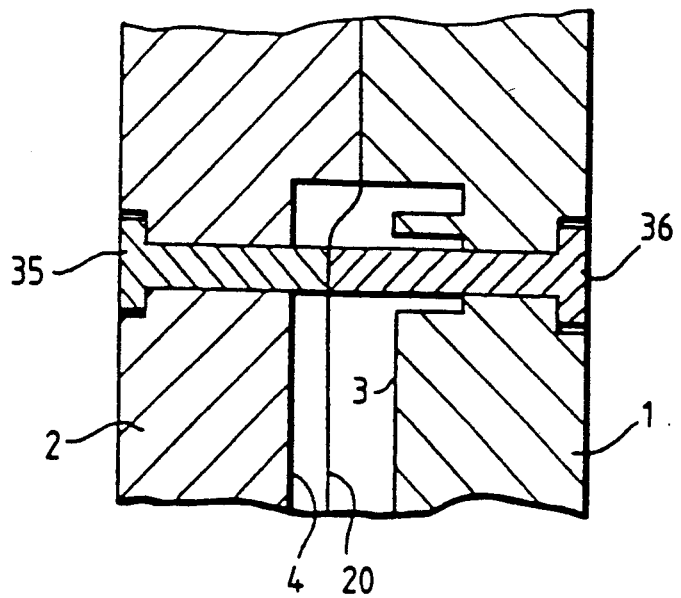
FIG. 5 is an enlarged sectional view of major parts of dies used for the image-transfer injection molding of a half portion of a casing body of a conventional magnetic tape cassette.
Figure 6:
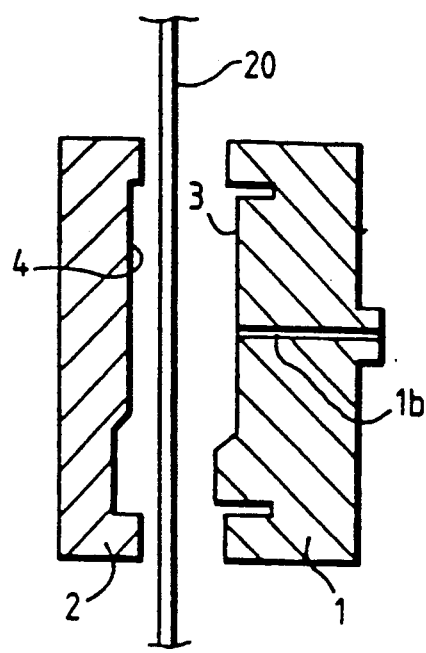
FIG. 6 is a sectional view of the dies for image-transfer injection molding of the half portion of the casing body of the conventional magnetic tape cassette.
Figure 7:
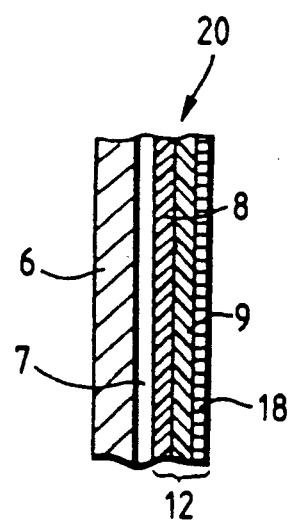
FIG. 7 is a sectional view of an image transfer film for image-transfer injection molding.

Four of each of the upper and the lower half portions 10 and 11 are simultaneously manufactured by injection molding using dies 1 and 2 as the image transfer film 20 remains pinched between the dies, as shown in FIGS. 3 and 4. AT that time, the image transfer layer 12 on the outside surface of the body of each of the four upper or lower half portions is made up of the protective layer 8, ink layer 9 and adhesive layer 18 of the image transfer film 20, which is composed of a base film 6, a peeling layer 7, the protective layer 8, the ink layer 9 and the adhesive layer 18, as shown in FIG. 7. The peeling layer 7, the protective layer 8, the ink layer 9 and the adhesive layer 18 are stacked in that order on the inside surface of the base film 6, whose outside surface is located opposite that of the upper or lower half portion 10 or 11 across the inside surface of the base film. The base film 6 is made of a high-molecular material such as polyethylene, polyethylene terephthalate, polypropylene is cellulose triacetate. The protective layers 8, ink layers 9 and adhesive layers 18 of the image transfer film 20, which form the image transfer layers 12 on the bodies of the four upper or lower half portions 10 or 11 at the time of the injection molding of the bodies, are disposed in a pattern corresponding to the dies 1 and 2. The image transfer film 20, which is shaped as a band, is intermittently and appropriately fed in a direction B, as shown in FIG. 4. During injection molding, the film 20 is pinched between the die 2 and plate-like holders 21, for example, so that appropriate tensile forces A are applied to the film in directions indicated in FIG. 4.

Pins 30 and 31 for forming screw holes 32, capstan holes 33, hub holes 14 and reference holes 34 are fitted in the dies 2 and 1, respectively, so that the tips 37 and 38 of the pins are engaged with each other, as shown in FIG. 3. The peripheral edge 39 of the tip of each of the pins 30 projects parallel to the axis of the pin 30 so that a recess is provided in the tip inside the peripheral edge; that is, the cross section of the peripheral portion of the tip is shaped as a wedge. The peripheral portion of the tip of each of the other pins 31 has a chamfer 40 corresponding to the peripheral portion of the tip of the pin 30.

When the image transfer film 20 is pinched between the dies 1 and 2, the film is also pinched between the tips of the pins 30 and 31 so that the film is acutely bent by the peripheral edge 39 of the tip of the pin 30 and the chamfer 40 of the tip of the other pin 31. The peripheral portions of the tips of the pins 30 and 31 are appropriately shaped so that the image transfer film 20 is severed along the peripheral edges 39 of the tips of the pins 30, except for the base film 6, when the image transfer film is pinched between the tips of the pins 30 and 31.

When the molten plastic is injected between the dies 1 and 2 through the runner of the die to push the image transfer film 20 onto the inside surface of the die 2, the molten plastic comes into contact with the adhesive layer 18 of the image transfer film so that the adhesive layer causes the protective layer 8 and ink layer 9 of the film to adhere to the outside of the upper or lower half portion 10 or 11. However, the parts of the protective layer 8, the ink layer 9 and the adhesive layer 18 which are pinched between the tips of the pins 30 and 31 are severed from the other parts of the layers along the peripheral edge 39 of the tip of each pin 30 and are peeled off together with the base film 6 when the base film is peeled off the outside surface of the body 10a or 11a of the upper or lower half portion 10 or 11. Therefore, when the base film is peeled away, no parts of the protective layer 8, the ink layer 9 and the adhesive layer 18, which are pinched between the pins 30 and 31 are left in the screw, capstan, hub or reference hole 16.

The present invention is not limited to the above-described embodiment, but may be practiced or embodied in other various ways without departing from the spirit or essential character thereof. For example, the peripheral portion of the tip of each of the pins 30 can be provided with a chamfer, and the peripheral edge of the tip of each of the other pins 31 made to protrude so that a recess is provided in the tip inside the peripheral edge. The cross section of the projecting peripheral portion of the tip of the pin 30 need not be wedge shaped, but may be shaped otherwise as far as the parts of the layers pinched between the tips of the pins 30 and 31 are severed from the other parts of the layers along the projecting peripheral edge of the tip of the pin 30 when the image transfer film is bent when it is pinched between the tips of the pins.

In the magnetic tape cassette molding method provided according to the present invention, the peripheral edge of the tip of one of several pins, which are fitted in dies so as to form a hole in the half portion of the casing body of a magnetic tape cassette, projects parallel to the axis of the pin so that a recess is provided in the tip of the pin inside the peripheral edge thereof. As a result, when an image transfer film is pinched between the dies, the parts of the layers of the film which are pinched between the tips of the pins are acutely and strongly bent by the tips of the pins so that the parts are severed from the other parts of the layers along the projecting peripheral edge of the tip of the pin. For that reason, the torn-off parts of the layers are peeled off together with the base film of the image transfer film when the base film is peeled from the outside surface of the half portion of the cassette casing body. Therefore, no parts of the layers which are pinched between the tips of the pins at the time of the molding of the half portion of the cassette casing body are left in the hole after the molding as an unnecessary film coupled to the image transfer layer on the outside surface of the half portion. Consequently, no separate step of removing the parts of the layers from the half portion following image-transfer molding is needed. The manufacture of the half portion is thus simplified to provide a cassette of good design at a lower cost.

What is claimed is:

1. A method for image-transfer molding a half portion of a casing body of a magnetic tape cassette, comprising the steps of:

providing a band of an image transfer film comprising, in the order stated, a base layer, a peeling layer, and an image transfer layer including a protective layer, an ink layer, and an adhesive layer;

pinching said band of image transfer film between dies for molding said half portion by closing said dies, wherein said adhesive layer is positioned to abut an outer surface of the molded half portion;

placing a pair of pins in said dies in a position where a hole is to be formed in said half portion, an end of one of said pins having a peripheral edge portion projecting in a direction parallel to a longitudinal axis of said pin and forming a recess in said end of said pin, said recess receiving therein an end of the other of said pins with a portion of said image transfer film sandwiched therebetween, said ends of said pins cooperating to sever said image transfer film along said peripheral edge except for said base layer as said two dies are closed and define said hole;

injecting molten plastic into said dies, said adhesive layer contacting and adhering to said plastic;

allowing said molten plastic to harden;

opening said dies; and peeling away said base layer causing the removal of any said severed image transfer film, including said image transfer layer, from said hole formed by said pins.

2. The image transfer molding method of claim 1, wherein said end of said other pin has a chamfered peripheral portion, said peripheral portion being received within said recess.

3. The image transfer molding method of claim 1, wherein said peripheral edge portion of said one of said pins is wedge shaped in cross section.

4. The image transfer molding method of claim 1, wherein a plurality of said pins are provided for forming a plurality of holes in said half portion.

5. The image transfer molding method of claim 1, wherein a plurality of said cassette halves are simultaneously molded.

* * * * *